S. P. COX.
PNEUMATIC WHEEL.
APPLICATION FILED SEPT. 24, 1910.
1,003,238.
Patented Sept. 12, 1911.
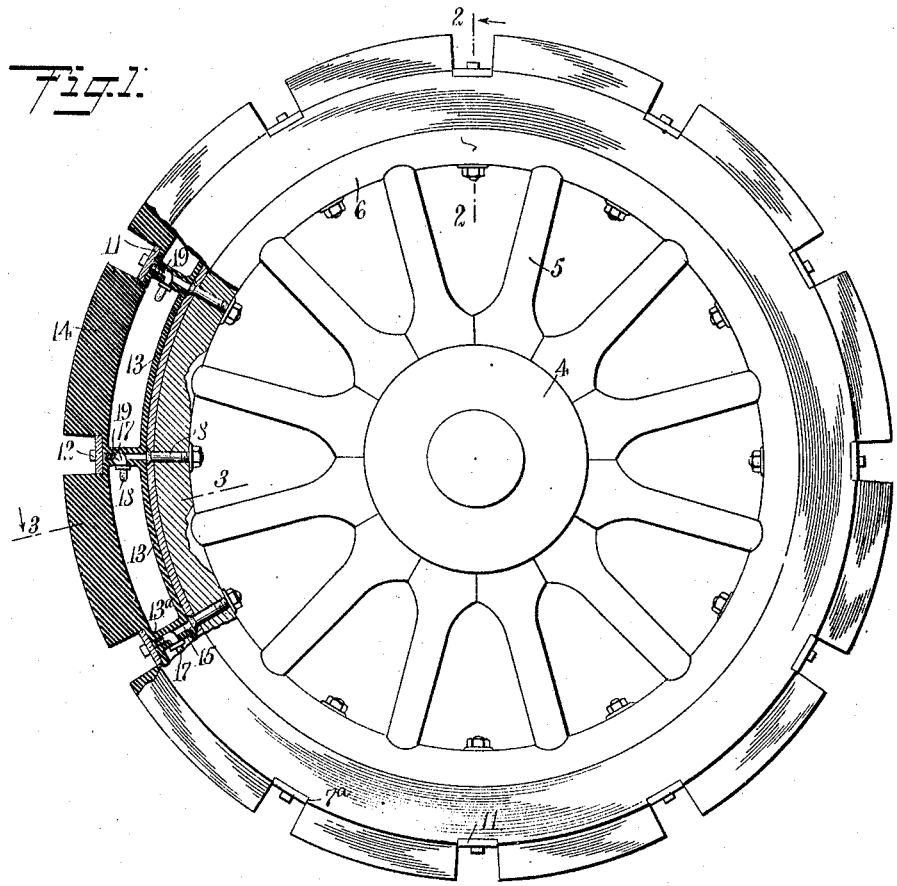
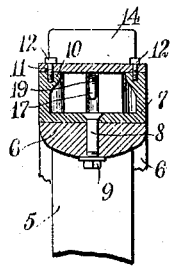
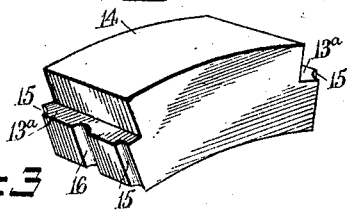
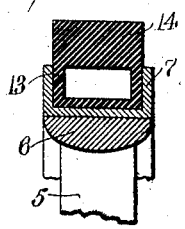
WITNESSES
INVENTOR
Stephen P. Cox
BY
ATTORNEYS

UNITED STATES PATENT OFFICE.

STEPHEN P. COX, OF BAYPORT, NEW YORK.

PNEUMATIC WHEEL.

1,003,238. Specification of Letters Patent. Patented Sept. 12, 1911.

Application filed September 24, 1910. Serial No. 583,601.

*To all whom it may concern:*

Be it known that I, STEPHEN P. Cox, a citizen of the United States, and a resident of Bayport, in the county of Suffolk and State of New York, have invented a new and Improved Pneumatic Wheel, of which the following is a full, clear, and exact description.

My invention relates to pneumatic wheels for use upon vehicles generally, and particularly automobiles, horseless carriages and the like, for running upon streets and roads.

More particularly stated, I provide an improved construction of wheel, in which the tire is made up of separate units, each carrying its own pneumatic cushion, and its individual foot (or feet) associated with said cushion, the various units being removable at will and consequently interchangeable.

Reference is to be had to the accompanying drawings forming a part of this specification, in which similar characters of reference indicate corresponding parts in all the views, and in which—

Figure 1 is a side view, partly in elevation and partly in section, showing my improved wheel complete; Fig. 2 is a section on the line 2—2 of Fig. 1 looking in the direction of the arrow; Fig. 3 is a section on the line 3—3 of Fig. 1 looking in the direction of the arrow; and Fig. 4 is a perspective of one of the units removed from the wheel.

The wheel is shown in Fig. 1 and is provided with a hub 4 and spokes 5, the latter carrying the rim 6 which may be of wood. Encircling this felly is a metallic rim 7, having the general form of an annular trough with parallel walls and flat bottom, as will be understood from Fig. 2. The metallic rim 7 is secured to the wooden rim 6 by aid of bolts 8 and nuts 9. The metallic rim 7 is provided with lugs 10 integral with it and disposed internally these lugs, being arranged in pairs, the pairs being spaced equally distant. The rim 7 is provided with notches 7ª corresponding to the various pairs of lugs 10, and likewise spaced equally distant. A number of tie plates 11 are fitted into the notches 7ª and are thus sunken flush with the outer edges of the metallic rim 7. A number of small bolts 12 are used to hold the tie plates 11 in position, being inserted through holes in the ends of the tie plates and extending into the lugs which are provided with threaded holes for receiving them, as will be understood from Fig. 2. At 13 are a number of separate air cushions, each having generally a sector like form and being crowned with a tread portion 14 also of sector like form. The air cushion and tread portion are connected integrally together, and for this purpose, are made each entirely of a single member of rubber, though I do not limit myself to this precise arrangement. Each air cushion at its end (see Fig. 4) is provided with two outer notches 15, and with one middle notch 16. Each air cushion is further provided at one of its ends only with a tube 17, having a valve 18 disposed integral of the cushion. Each tube 17 is further provided with a nipple 19, which projects outwardly a very slight distance, and is covered and protected by the tie plate.

Each air cushion 13 is slightly longer than its shoe 14, and on this account the complete unit consisting of air cushion and shoe is provided practically with stepped ends 13ª (see Fig. 4), these stepped ends being over-lapped slightly by the tie plates 11 and the units thus held in position. Each tie plate 11 holds down the abutting ends of two air cushions, and consequently helps to retain two units in place.

In order to remove any one of the units, the tie plates 11 at the ends of the unit are taken off, this being accomplished by taking out the bolts 12. In order to inflate one of the air cushions, it is not necessary to remove the unit containing the cushion. The adjacent tie plate is removed. A tube from an air pump is temporarily connected with the nipple 19 and the air forced through, the manner of inflation being very much like that of inflating a tire. The various air cushions being independent of each other, the several shoes 14 are similarly independent, and if one breaks down or becomes damaged in any way, this does not interfere greatly with the action of the wheel as a whole.

I do not limit myself to the precise construction shown and described, as variations may be made therein, without departing from the spirit of my invention. Neither do I limit myself to any special use or services to be performed by the wheel or to any special type of vehicle upon which the wheel is to be operated.

Having thus described my invention, I claim as new and desire to secure by Letters Patent.

1. A pneumatic wheel, comprising a rim provided internally with lugs, a plurality of air cushions, each fitted to said rim and having ends shaped to fit around said lugs, and means for holding said air cushions in position.

2. A pneumatic wheel, comprising a central member of substantial circular form, and a plurality of separate air cushions mounted upon said central member and having portions disposed end to end, said portions being provided with grooves, each unit having an air pipe disposed partly within the groove at one end of a unit, and partly within another groove disposed at the end of the next successive unit.

In testimony whereof I have signed my name to this specification in the presence of two subscribing witnesses.

STEPHEN P. COX.

Witnesses:
 WALTON HARRISON,
 PHILIP D. ROLLHAUS.

Copies of this patent may be obtained for five cents each, by addressing the "Commissioner of Patents, Washington, D. C."